Figure 1:
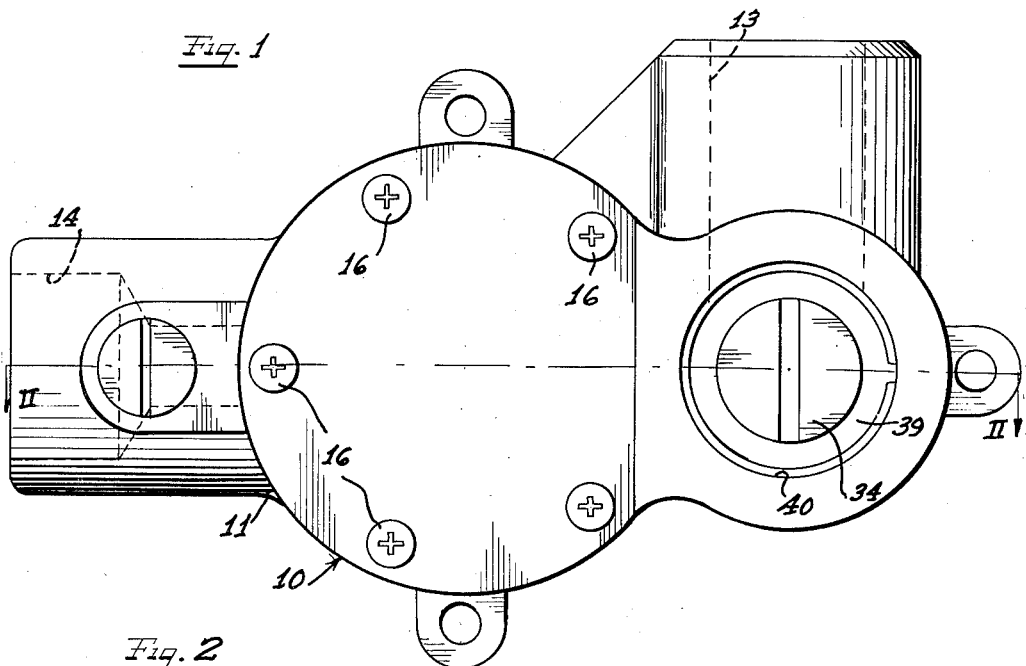

July 2, 1957  S. G. ESKIN  2,797,872
GAS CONTROL VALVE
Filed Nov. 19, 1954

Inventor
Samuel G. Eskin

United States Patent Office 2,797,872
Patented July 2, 1957

2,797,872

GAS CONTROL VALVE

Samuel G. Eskin, Chicago, Ill., assignor to The Dole Valve Company, Chicago, Ill., a corporation of Illinois Application November 19, 1954, Serial No. 469,885

7 Claims. (Cl. 236—48)

This invention relates to improvements in thermostatically operated shut-off valves and more particularly relates to shut-off valves suitable for controlling the supply of fuel to a gaseous fuel burner.

A principal object of my invention is to provide a novel, simple and positively acting valve, closed by a thermostatic operating device, for positively shutting off the flow of fluid at the temperature at which the thermostatic operating device is set.

A further object of my invention is to provide a simple and compact form of thermostatically operated shut-off valve in which the thermostatic element is sealed to the valve body and has a casing extending outwardly from said body for association with a medium being heated and has an operating member extending within said valve body operable to positively shut off the flow of fuel through the valve, when the temperature of the medium being heated reaches the operating range of the thermostatic element.

A still further object of my invention is to provide a more efficient and economical positively acting shut-off valve for gaseous fuel than has formerly been provided, and particularly adapted to control the flow of gaseous fuel to a main gas burner for a hot water heater and utilizing a wax or power type of thermostatic element, the casing of which may be strapped to the wall of a hot water heater and closed by a flexible diaphragm, operable to operate the shut-valve to shut off the supply of gas to the burner.

A still further object of my invention is to provide a simpler more compact and economical form of thermostatically operated gas shut-off valve than formerly, by utilizing a wax type of thermostatic element having a casing extending outwardly through the valve body and a power member extensible within the casing upon predetermined increases in temperature, and by utilizing a simple leverage arrangement to retractibly move the power member with respect to its casing, and operating to release the shut-off valve to close with a snap action, upon extension of the power member, together with a simple means for varying the operating range of the thermostatic element by varying the angular relation of said leverage arrangement with respect thereto.

Still another object of my invention is to provide an inexpensive and simple thermostatically operated control device for a gas burner in which a simple and compact form of wax type of thermostatic element forms a closure for the wall of the valve body and extends outwardly therefrom for strapping to the wall of a hot water heater and the like, and in which a flexible metallic diaphragm contains a thermally expansible fusible material within the casing and effects the closing of the valve upon the extension of the diaphragm from its casing, upon fusion of the fusible material contained therein and in which the operating means for the valve consists in a simple lever arrangement releasable from the valve operating mechanism to effect operation thereof, to close the valve with a snap action.

Another and important object of my invention is to provide a thermostatically operated control device in which the compactness of the device is attained by the use of a relatively flat power type of thermostatic element in which a fusible material is contained within a casing by a flexible diaphragm, and in which the means for effecting closing of the valve from the thermostatic element serves to return the diaphragm of the element with respect to its casing upon reductions in temperature.

Figure 2:
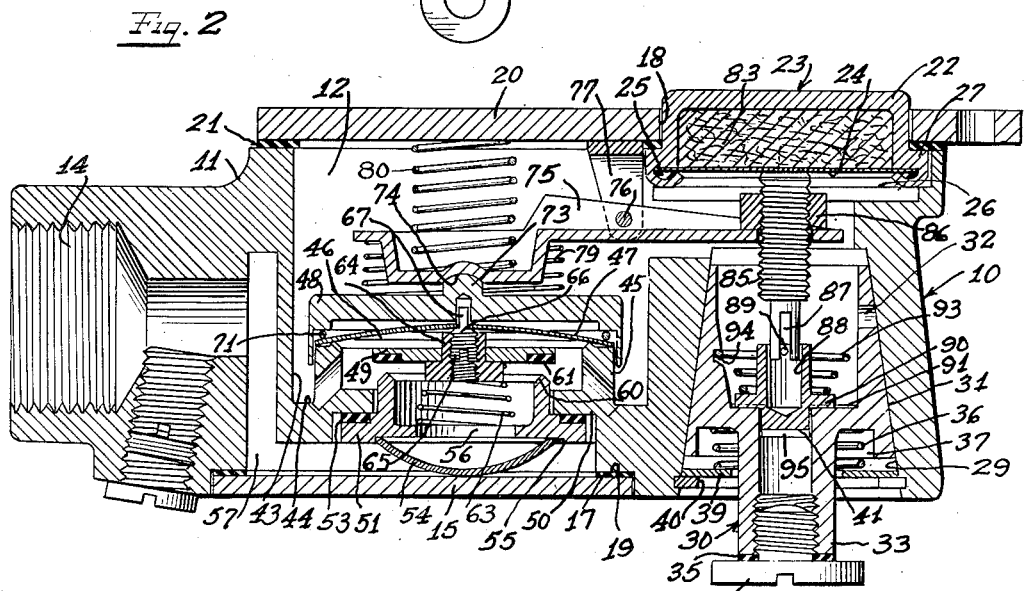

These and other objects of my invention will appear from time to time as the following specification proceeds and with the reference of the accompanying drawings wherein:

Figure 1 is a top plan view of a thermostatically operated valve constructed in accordance with my invention; and Figure 2 is a transverse sectional view taken substantially along line II—II of Figure 1.

In the embodiment of my invention illustrated in the drawings, I have shown a valve 10, which may control the supply of gaseous fuel to the main burner of a gas hot water heater or like device. The valve 10 is shown as including a valve body 11 having a valve chamber 12 therein with an inlet 13 leading into said valve body and an outlet 14 leading therefrom. The valve body 11 is closed at one end by a cover plate 15, retained thereto as by machine screws 16 and sealed thereto by a sealing member 17, engaging the surface of a recessed shoulder 19 of said valve body.

The opposite end of the valve body 12 is shown as being closed by a cover plate 20 sealed thereto as by a seal 21 and suitably secured thereto, as by machine screws (not shown). The cover plate 20 is shown as having an opening 18 therein, for a casing 22 of a thermostatic element 23. The casing 22 opens to the inside of the valve body and is closed by a flexible diaphragm 24, sealed thereto as by a seal 25. The cover plate 20 engages the inner end of the casing 22 with a shouldered portion 26 of said valve body within the chamber 12. The casing 22 is sealed to said valve body by the seal 21, engaging a shouldered portion 27 of this thermostatic element. The thermostatic element 23 extends outwardly through the opening 18 for engagement with the wall of a hot water heater or for a direct engagement with a medium being heated or the container therefor.

The thermostatic element 23 is a so-called power or solid fill wax type of element in which a fusible material 83, such as a wax alone, a wax and a heat conducting material such as a metal wool, or a wax and powdered metal and a binder are contained in the casing 22 by the diaphragm 24, and extend the diaphragm with respect to its casing upon fusion of the fusible material therein.

The inlet 13 leads into the chamber 12 through the frusto-conical wall of the seat 29 for a rotary or plug valve 30, having a generally frusto-conical seating surface or wall 31, slidably engageable with the seat 29. The plug valve 30 is provided with a port 32 therein communicating with a registering port (not shown) extending through the wall of the seat 29, when the valve 30 is positioned to admit gaseous fuel within the valve chamber 12. As herein shown, the port 32 communicates with the hollow interior portion of the valve 30 and has communication with the chamber 12 through the hollow interior of said plug valve. The valve 30 also has a hollow stem 33 extending outwardly therefrom to the outside of the valve body 11, and closed by a large diameter head machine screw 34 threaded therein and sealed thereto as by a seal 35. The plug valve 30 is retained to the seat 29 by a spring 36 seated within an annular outwardly facing recessed portion 37 of said plug valve at one of its ends, and abutting a washer 39 at its opposite end, and retained in position as by a snap ring 40. The machine screw 34 affords a means for turning the plug valve 30 and is also removable to afford access to a calibrating member 41 for the thermostatic element 23, as will hereinafter more clearly appear as this specification proceeds.

The valve chamber 12 is shown as having a wall 43 which may be cylindrical, and terminates at its end adjacent the cover plate 15 into an inwardly extending wall 44 extending parallel to the cover plate 15 and having an annular wall 45 extending upwardly therefrom, within the chamber 12 for a short distance. The wall 45 terminates at its inner end into an annular fulcrum 46, providing a knife edge fulcrum for a snap acting disk 47. The snap acting disk 47 is shown as being held by a reaction member 48, in position to accommodate a shut-off valve 49 to be held open, and to snap in a direction to close the valve 49, upon the release of said disk by the reaction member 48, as will hereinafter more clearly appear as this specification proceeds.

The wall 44 is shown as having a downwardly facing shouldered opening 50 leading therethrough and having a seating member 51 engaging the shouldered portion of said shouldered opening and sealed thereto as by an annular sealing member 53. The seating member 51 is pressed into engagement with the sealing member 53 by a convexly bowed leaf spring 54 engaging a shouldered portion 55 of the seating member 51 at its ends and retained in engagement therewith by the cover 15.

The seating member 51 extends through the shouldered opening 50 and has a shouldered port 56 extending therethrough, which terminates into an annular valve seat 60, engageable by a resilient annular face 61 of the valve 49.

The valve 49 is shown as being biased into an open position by a compression spring 63, seated on the shoulder of the shouldered port 56, and extending around the head of a headed bushing 64, extending through the valve 49.

The bushing 64 is shown as being internally threaded and as having a screw 65 threaded therein having a shoulder 66 engaging the snap action disk 47 and having a pin 67 extending through said snap acting disk within a central recessed portion of the reaction member 48.

The reaction member 48 is shown as extending around the outside of the wall 45, and as having guiding engagement with said wall for movement therealong. Said reaction member has an annular bearing surface facing the disk 47, and formed by a wire 71 extending about said reaction member, inwardly of the outer margin thereof and spaced outwardly of the annular fulcrum 46. The wire 71 bears against the disk 47 and holds said disk from snapping in a direction to snap the valve 47 closed.

The opposite side of the reaction member 48 from the disk 47 has a boss 73 projecting therefrom, for engagement with a socket 74 formed in a holding lever 75 for said reaction member. The holding lever 75 is shown as being pivoted intermediate its ends on a pivot pin 76, supported at its ends in a bracket 77 extending inwardly from the cover 20.

A relatively light spring 79 is shown as being interposed between the reaction member 48 and the lever 75 for exerting pressure on the reaction member 48 to delay release of the snap acting disk 47, until the holding lever 75 has moved a distance sufficient to release said reaction member and accommodate the valve 49 to snap closed. A compression spring 80 is shown as being interposed between the inner side of the plate 20 and the holding lever 75 for retaining the boss 73 in engagement with the socket 74 and holding the reaction member 48 in the position shown in Figure 2, to hold the disk 47 from snapping to close the valve 49. The spring 80 also biases the lever 75 in a direction to return the diaphragm 24 of the thermostatic element 23 to the position shown in Figure 2, upon reductions in temperature.

The operating range of the thermostatic element 23 is shown as being varied by a threaded rod 85 engaging the metallic diaphragm 24 at its end and maintained in engagement therewith by the biasing or return spring 80. The rod 85 extends through the lever 75 and is shown as being threaded in a block 86, welded or otherwise secured to said lever. The opposite end of the rod 85 from the diaphragm 24 is shown as being slotted as indicated by reference character 87 and as extending within a hollow interior portion 88 of the calibrating member 41. A pin 89 secured at its ends to the wall portion of the calibrating member 41 defining the hollow interior portion 88 thereof, extends through the slotted portion 87 of the plunger 85 to turn the same and adjustably move said plunger to vary the movement of the lever 75 necessary to release the reaction member 48 and thus to vary the operating range of the thermostatic element 23.

The calibrating member 41 is provided with a radial flange 90, intermediate its ends, which is biased into engagement with a serrated face 91 of the hollow interior portion of the plug valve 30, by a compression spring 93, engaging said flange and seated in spaced recessed portions 94 formed in the wall, defining the hollow interior portion of the plug valve 30.

Upon the turning of the plug valve 30 into position to admit fuel into the valve chamber 12, the block 86 will be moved toward the diaphragm 24. This will increase the distance the diaphragm 24 must move to release the disk 47 to snap to a valve closing position. This will increase the temperature range at which the thermostatic element 24 closes the valve 47. If desired, the outer face of the valve body may have indicia thereon (not shown) to designate the open and shut positions of the valve and the operating range of the thermostatic element 23 as the plug valve 30 is turned to its various open positions.

When it is desired to calibrate the thermostatic element 23 the machine screw 34 may be removed from the hollow stem 33 of the plug valve 30, and a screw driver or like tool may be inserted within said stem into engagement with a slot 95 in the calibrating member 41. The screw driver may then be depressed to release the calibrating member 41 from the serrated portion 91 of the plug valve 30 and may be turned to adjust the temperature setting of the thermostatic element.

In operation of the valve, when the thermostatic element 23 has been properly calibrated, the plug valve 30 is first turned to an on position and to the temperature position at which it is desired the shut-off valve 49 close.

When the temperature to which the casing 22 of the thermostatic element 23 is subjected reaches the range of fusion of the fusible material contained within the casing 22 by the flexible diaphragm 24, the fusible material will expand and extend the diaphram 24 with respect to the casing 22. This will effect the pivoting of the lever arm 75 about the axis of the pivot pin 76 in a direction, which in Figure 2 is shown as being a clockwise direction, to release the reaction member 48 from the snap acting disk 47, and allow said disk to snap past center and close the valve 49 with a snap action. As the temperature to which the thermostatic element 23 subjected is reduced, the spring 80 engaging the annular engaging surface 71 with the disk 47, will snap said disk to the position shown in Figure 2 and accommodate the spring 63 to open the valve 49. The spring 80 will also retractably move the flexible diaphragm 24 with respect to its casing 22 and return the fusible material therein by operation of the lever 75.

It will be understood that various modifications and variations of the present invention may be effected without departing from the spirit and scope of the novel concepts thereof.

I claim as my invention:

1. In a thermostatically operated gas shut-off valve, a valve body having a chamber therein, an inlet into said chamber and an outlet therefrom, a valve seat in said chamber separating said inlet from said outlet, a valve engageable with said seat, a spring biasing said valve out of engagement with said seat, a thermostatic element carried in said valve body and having a casing mounted in said valve body and extending outwardly therefrom for direct contact with a medium being heated and having a power member extensible within said chamber upon certain predetermined increases in temperature, releasable snap acting means engageable with said valve and releasable to close said valve with a snap action, a reaction member engageable with said releasable snap acting means to hold said snap acting means from closing said valve, a lever pivoted within said chamber and operatively connecting said power member with said reaction member, spring means biasing said lever into engagement with said reaction member and said reaction member into engagement with said releasable snap acting means, and an adjustable connection between said lever and said power member to vary the temperature of closing of said valve, said power member moving within said chamber upon predetermined increases in temperature and moving said lever against said spring means to release said reaction member from said releasable snap acting means, to effect the closing of said valve with a snap action.

2. In a thermostatically operated gas shut-off valve, a valve body having a chamber therein, an inlet into said chamber and an outlet therefrom, a valve seat in said chamber separating said inlet from said outlet, a valve engageable with said seat, a spring biasing said valve out of engagement with said seat, a solid fill thermostatic element carried in said body and comprising a casing having a closed end on the outside of said valve body and a power member extensible from said casing within said valve body upon predetermined increases in temperature, releasable means for closing said valve with a snap action, lever means pivotally mounted in said chamber for movement about an axis intermediate said power member and said releasible means, and connected with said power member and said releasable means for holding said releasable means to accommodate said biasing spring to maintain said valve open, said lever means releasing said releasable means to effect closing of the valve by extension of said power member within said chamber.

3. In a thermostatically operated gas shut-off valve, a valve body having a chamber therein, an inlet into said chamber and an outlet therefrom, a valve seat in said chamber separating said inlet from said outlet, a valve engageable with said seat, a spring biasing said valve out of engagement with said seat, snap acting means releasable to engage said valve with said seat, a solid fill thermostatic element carried in said valve body and comprising a casing extending outwardly of said body and sealed thereto and having a closed end on the outside of said body and a flexible metal diaphragm closing the inner end of said casing and retaining a fusible material within said casing and forming a power member for said thermostat, lever means pivotally mounted within said chamber for movement about an axis disposed between said diaphragm and said snap acting means connected therewith for holding said snap acting means from closing the valve, and moved by said diaphragm to release said snap acting means to close the valve upon extensible movement of said diaphragm with respect to said casing.

4. An over-temperature gas shut-off valve comprising a valve body having a chamber therein, an inlet into said chamber, an outlet therefrom, a thermostatic element carried in said valve body, a casing for said thermostatic element extending outwardly of said valve body, a metal diaphragm within said valve body for closing said casing and retaining a fusible material therein, lever means engageable with said diaphragm, a spring biasing said lever means to retract said diaphragm with respect to said casing, a shut-off valve in said chamber and controlling the flow of gas through said outlet, a valve spring biasing said valve in an open position, a snap action disk for closing said valve with a snap action, a fulcrum for said disk inwardly of the margin thereof and on the side thereof facing said valve, a reaction member engaging said disk outwardly of said fulcrum on the opposite side of said disk from said fulcrum and engaged by said lever means and held by said lever means to accommodate said valve spring to hold said valve open, and releasable upon expansion of said diaphragm and movement of said lever means away from said reaction member to accommodate said valve to close, and means for varying the operating range of said thermostatic element comprising means for varying the angular relation of said lever means with respect to said diaphragm when in a retracted position, for varying the movement of said lever means necessary to release said reaction member from said snap acting disk to snap said valve closed.

5. In a thermostatically operated gas shut-off valve, a valve body having a chamber therein, a rotary valve turnable to admit gas into said chamber, an inlet to said rotary valve, an outlet from said chamber, a valve seat in said chamber separating said inlet from said outlet, a valve engageable with said seat, a spring biasing said valve out of engagement with said seat, a snap acting disk engageable with said valve for engaging said valve with said seat with a snap action, upon the release of pressure from said disk, a reaction member for said disk mounted for axial movement with respect to said valve, a thermostatic element carried by said valve body and having a power member extensible within said chamber upon certain predetermined increases in pressure and in axial alignment with the axis of turning movement of said rotary valve, a lever engageable with said reaction member and holding said reaction member in position to hold said snap action disk to retain said valve in an open position, an operative connection between said lever and said power member comprising an adjusting member threaded in said lever and engageable with said power member in axial alignment with the axis of turning movement of said rotary valve, and an operative connection between said rotary valve and said adjusting member for varying the angular relationship of said lever with respect to said power member upon movement of said rotary valve to an open position, and thus varying the operating range of said thermostatic element.

6. An over-temperature gas shut-off valve comprising a valve body having a chamber therein, an inlet into said chamber, a rotary valve turnable to admit gas from said inlet into said chamber, an outlet from said chamber, a thermostatic element carried in said valve body and comprising a casing extending outwardly of said valve body and having a metal diaphragm within said chamber closing the end of said casing and retaining a fusible material therein, said diaphragm being extensible within said chamber upon predetermined increases in temperature, a lever pivoted intermediate its ends within said chamber, an adjusting member threaded in one end of said lever and having bearing engagement with said diaphragm, a spring biasing said lever to retract said diaphragm within said casing, a shut-off valve in said chamber for controlling the flow of gas through said outlet, a valve spring biasing said valve in an open position, a snap acting disk for closing said valve with a snap action, a fulcrum for said disk on the side thereof facing said valve and inwardly of the margin thereof, a reaction member engaging said disk on the opposite side thereof from said fulcrum and outwardly of said fulcrum and held by said lever to accommodate said valve spring to hold said valve open and releasable upon expansion of said diaphragm to accommodate said valve to close, and a releasable drive connection from said rotary valve to said threaded member for turning said threaded member upon turning movement of said rotary valve to an open position to vary the angular relation of said lever with respect to the face of said diaphragm when retracted and the operating range of said thermostatic element and releasable from said plug valve and turnable independently of said valve for calibration of said thermostatic element.

7. In a thermostatically operated gas shut-off valve, a valve body having a chamber therein, an inlet into said chamber and an outlet therefrom, a valve seat in said chamber separating said inlet from said outlet, a valve engageable with said seat, a spring biasing said valve out of engagement with said seat, a thermostatic element carried in said valve body and having a casing extending within said valve body and having a portion extending outwardly from said valve body for association with a source of heat and also having a power member extensibly movable within said valve body upon predetermined increases in temperature, releasable snap acting means engageable with said valve and releasable to close said valve against said spring with a snap action, a reaction member engageable with said releasable snap acting means to hold said snap acting means from closing said valve, a lever pivoted within said chamber, spring means biasing said lever into engagement with said reaction member and holding said reaction member in a stressed condition to hold said snap acting means form snapping said valve shut, an adjustable connection between said power member and said lever for varying the movement of said lever required to release said reaction member from said releasable snap acting means and the temperature of closing of said valve, and means accessible from the outside of said valve body for adjusting said adjustable connection and the temperature of closing of said valve.

References Cited in the file of this patent
UNITED STATES PATENTS

| | | |
|---|---|---|
| 1,633,908 | Schnepp | June 28, 1927 |
| 1,908,765 | Kay | May 16, 1933 |
| 1,916,814 | Shivers | July 4, 1933 |
| 2,129,937 | Johnson | Sept. 13, 1938 |
| 2,303,011 | Weber | Nov. 24, 1942 |
| 2,303,127 | Koppel | Nov. 24, 1942 |
| 2,614,754 | Caparone | Oct. 21, 1952 |

FOREIGN PATENTS

| | | |
|---|---|---|
| 327,978 | Great Britain | Apr. 14, 1930 |